Jan. 8, 1929.  
C. C. FARMER  
FEED VALVE DEVICE  
Filed Aug. 24, 1927  
1,697,972
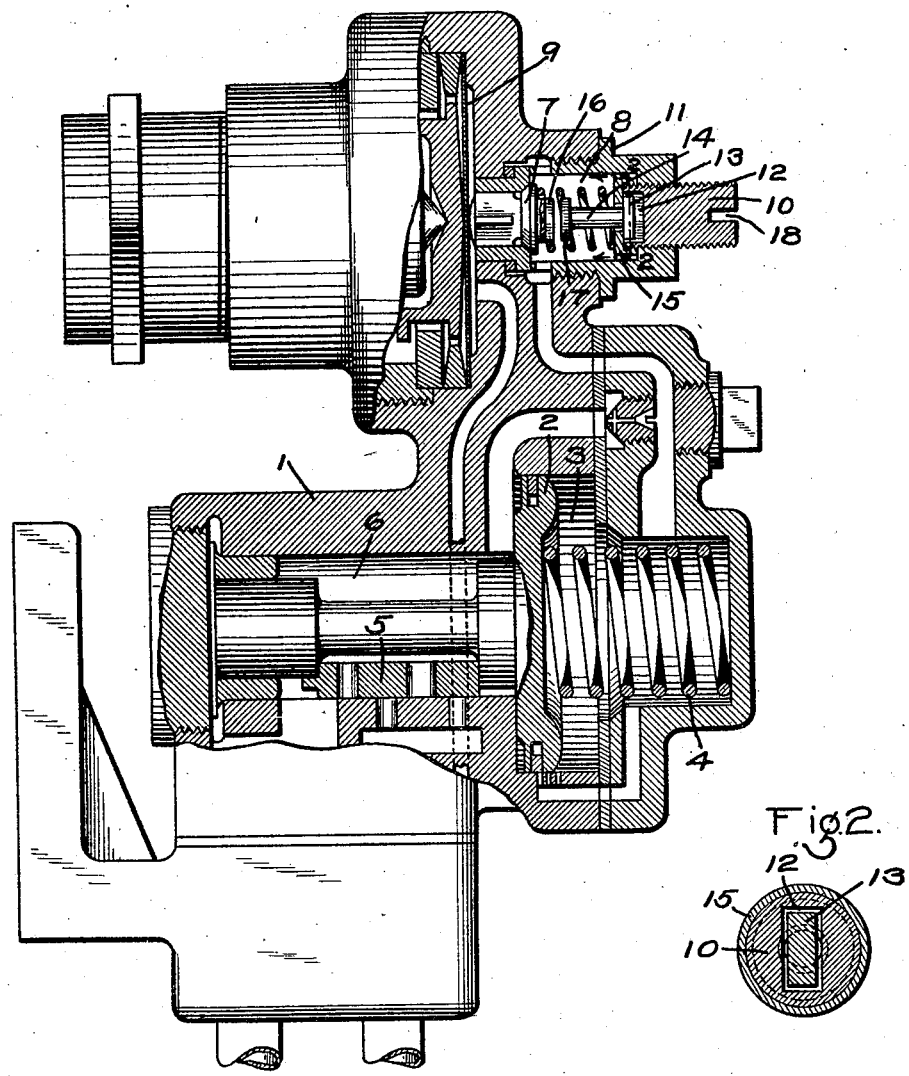
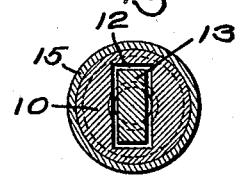
INVENTOR  
CLYDE C. FARMER  
BY  
ATTORNEY Patented Jan. 8, 1929.

1,697,972

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Application filed August 24, 1927. Serial No. 215,090.

This invention relates to feed valve devices employing a regulating valve, such as the feed valve device employed to feed fluid under pressure to the brake pipe of a fluid pressure brake system.

The regulating valve of a feed valve device is rendered inoperative, due to sticking or being held open by dirt, pipe scale, or gummy oil which is often present in the fluid under pressure passing through the feed valve device. Failure of the regulating valve to close will then cause the feed valve device to cut off the feed of fluid under pressure to the brake pipe when not intended.

The principal object of my invention is to provide means for effecting the reseating of the regulating valve in case the valve is held unseated.

In the accompanying drawing; Fig. 1 is a sectional view of a feed valve device embodying my invention; and Fig. 2 a section on the line 2—2 of Fig. 1.

As shown in the drawing, the feed valve device may comprise a casing 1 having a fluid pressure supply portion and a regulating portion. The fluid pressure supply portion comprises a piston 2 contained in piston chamber 3 and subject to the pressure of a coil spring 4, and a slide valve 5, contained in valve chamber 6 and adapted to be operated by piston 2.

The regulating portion may comprise a regulating valve 7, contained in valve chamber 8, and a flexible diaphragm 9, adapted to operate said valve.

According to my invention, a device is provided for effecting a longitudinal and rotative movement of the valve 7 when desired. Said device may comprise a screw-threaded stem 10 having screw-threaded engagement in a screw plug 11, the plug 11 being screwed into a threaded opening in the casing 1, so disposed that the plug is in axial alinement with the valve 7.

At its inner end, the stem 10 is provided with a key-shaped recess 12 for receiving the key-shaped head 13 of a pin 14, the head 13 being held in the recess 12 by a cap plate 15 having screw-threaded engagement with the stem 10 and having a central bore, through which the pin 14 extends.

The outer end of the valve 7 is provided with a boss having a slot 16 adapted to receive a rectangular shaped head 17 provided at the inner end of the pin 14.

When there is a failure of the valve 7 to seat, the stem 10 is rotated by inserting the end of a screw driver in the slot 18 provided at the outer end of the stem. The rotation of the stem 10 causes the pin 14 to be moved longitudinally so that the head 17 engages in the slot 16 of the valve 7. The valve 7 is then rotated and at the same time is pressed to its seat, cutting through or crushing any foreign matter which may be interposed between the valve and its seat.

When the stem 10 has been screwed inwardly, sufficiently to bring the valve 7 to its seat, the stem 10 is then screwed out, so that the parts are returned to the normal position, as shown in the drawing.

It will be noted that when the stem 10 is screwed out to the position shown, a face of the cap 15 engages a face of the plug 11, so as to provide a metal to metal joint and thus prevent possible leakage of fluid from valve chamber 8 past the screw threads on the stem 10 to the atmosphere.

The recess 12 is of such depth as to provide a clearance space back of the head 13. This clearance space facilitates the engagement of the head 17 in the slot 16, by permitting relative movement of the pin 14 with respect to the valve 7.

Having now described my invention, what I claim as new and desire to secure by Letters Patent, is:—

1. A valve device comprising a casing, a valve mounted in said casing and having a slot at its outer end, a plug having screw-threaded engagement in said casing and disposed in axial alinement with said valve, a stem having screw-threaded engagement in said plug and having a key-shaped recess, a pin having a key-shaped head disposed in said recess, and a head carried by said pin and adapted to engage in the slot in said valve.

2. A valve device comprising a casing, a valve mounted in said casing and having a slot, a pin having a head adapted to engage in said slot upon a longitudinal and a rotative movement of said pin, and a stem operatively connected to said pin for imparting a longitudinal and rotative movement to said pin, said pin having a longitudinal movement relative to said stem.

In testimony whereof I have hereunto set my hand.

CLYDE C. FARMER.